United States Patent
Ofir et al.

(10) Patent No.: US 8,417,283 B2
(45) Date of Patent: Apr. 9, 2013

(54) METHOD AND APPARATUS FOR CONVEYING USAGE AND ACCESS RIGHTS INFORMATION FOR EACH SUB-SLOT ON A CARRIER

(75) Inventors: Gabi Ofir, Gush (IL); Aharon Elmaleh, Makabim-Re'ut (IL); Baruh Hason, Tel Aviv-Yaffo (IL); Salomon Serfaty, Gaash (IL)

(73) Assignee: Motorola Solutions, Inc., Schaumburg, IL (US)

( * ) Notice: Subject to any disclaimer, the term of this patent is extended or adjusted under 35 U.S.C. 154(b) by 191 days.

(21) Appl. No.: 12/960,521

(22) Filed: Dec. 5, 2010

(65) Prior Publication Data
US 2012/0142340 A1 Jun. 7, 2012

(51) Int. Cl.
*H04M 1/00* (2006.01)
(52) U.S. Cl. .................. 455/550.1; 455/561; 455/452.2; 370/347
(58) Field of Classification Search ............... 455/550.1, 455/561, 452.2; 370/347
See application file for complete search history.

(56) References Cited

U.S. PATENT DOCUMENTS

| 5,537,414 A * | 7/1996 | Takiyasu et al. ............. 370/347 |
| 7,009,960 B2 * | 3/2006 | Ho .............................. 370/347 |
| 2010/0158039 A1 * | 6/2010 | Koide et al. ................... 370/447 |

* cited by examiner

*Primary Examiner* — Danh Le
(74) *Attorney, Agent, or Firm* — Anthony P. Curtis; Daniel R. Bestor (57) ABSTRACT

Apparatuses and methods are disclosed for increasing calling capacity in a carrier by dividing timeslots on the carrier into sub-slots and for conveying usage and access rights information for each sub-slot on a carrier. A base station configures a control signal that is associated with each of a plurality of timeslots on a carrier. Each of the plurality of timeslots is divided into sub-slots and specific fields in the control signal are associated with each sub-slot. The base station provides, to mobile stations, at least one of a usage marker or access rights information through the control signal. The mobile stations use the usage marker or access rights information to determine whether transmission of voice traffic and control signaling is permitted on each sub-slot.

20 Claims, 5 Drawing Sheets

METHOD AND APPARATUS FOR CONVEYING USAGE AND ACCESS RIGHTS INFORMATION FOR EACH SUB-SLOT ON A CARRIER

FIELD OF THE DISCLOSURE

The present disclosure relates generally to Terrestrial Trunk Radio (TETRA) protocols and more particularly to enhancing TETRA protocols to increase calling capacity.

BACKGROUND

Terrestrial Trunk Radio (TETRA) is a global standard for radio communications on private/professional mobile radios. Any TETRA standards or specifications referred to herein may be obtained by contacting ETSI at ETSI Secretariat, 650, Route des Lucioles, 06921 Sophia-Antipolis Cedex, FRANCE. Professional mobile radios include radios, other than mobile telephones, such as mobile radios, portable radios, and the like. According to existing TETRA protocols, four channels are interleaved into one carrier using Time Division Multiple Access (TDMA) protocol, with a 25 kilohertz (kHz) carrier spacing. Each channel indicates a logical assignment on the carrier and is assigned one physical timeslot. Because four channels are interleaved into one carrier, a frame on the carrier is physically divided four timeslots, one for each channel. Hence, systems implementing existing TETRA protocols can support up to four simultaneous and independent calls on a single carrier.

In TETRA systems, channels are shared resources. A base station in a TETRA system automatically allocates the channels to radios at the beginning of each call. Radios thereafter transmit voice/data traffic or control/signaling streams on the assigned channels. Cost savings are therefore achieved in base stations where only one radio unit is needed for every four user channels. Both point-to-point (direct individual calls) and point-to-multipoint calls (group calls) may be made using TETRA protocols.

Existing TETRA protocols may be enhanced to further increase the carrier capacity. For example, existing TETRA protocols can be enhanced to support more simultaneous and independent calls on a carrier by further dividing physical timeslots into sub-slots. Existing TETRA protocols can also be enhanced to improve protocol services to support new multiplexing schemes. To support legacy TETRA units (base stations and mobile stations that are using existing TETRA protocols), enhancements to TETRA protocols need to be backward compatible so that legacy TETRA units can continue to work with units using enhanced TETRA protocols.

Accordingly, there is a need for a method and apparatus for conveying usage and access rights information for each sub-slot on a carrier.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments are directed to providing apparatuses and methods for increasing calling capacity in a carrier by dividing timeslots on the carrier into sub-slots and conveying usage and access rights information for each sub-slot on a carrier. A base station configures a control signal that is associated with each of a plurality of timeslots on a carrier. Each of the plurality of timeslots is divided into sub-slots and specific fields in the control signal are associated with each sub-slot. The base station provides, to mobile stations, at least one of a usage marker or access rights information through the control signal. The mobile stations use the usage marker or access rights information to determine whether transmission of voice traffic and control signaling is permitted on each sub-slot.

Figure 1:
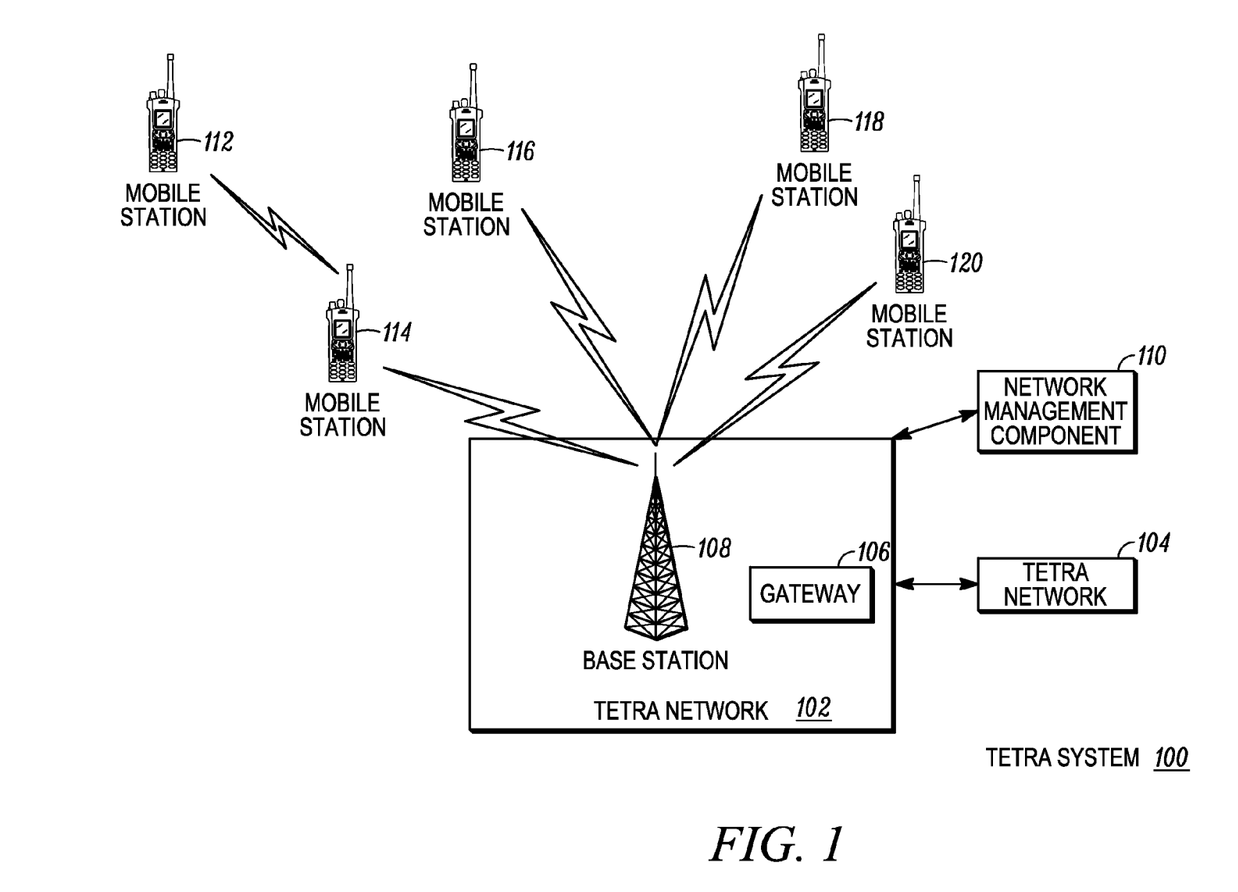
FIG. 1 is a block diagram of a Terrestrial Trunk Radio (TETRA) system used in accordance with some embodiments.

FIG. 1 is a block diagram of a Terrestrial Trunk Radio (TETRA) system 100 used in accordance with some embodiments. System 100 includes one or more TETRA networks 102-104, each of which is connected to mobile stations. Each TETRA network 102-104 includes one or more base stations, for example base station 108, which is configured to relay voice/data traffic to and from associated mobile stations. Base stations in TETRA network 102-104 may also send and receive control/signaling streams to and from associated mobile stations. Each TETRA network 102-104 also includes a gateway, for example gateway 106, for connecting the TETRA networks to each other. Mobile stations 112-120 include professional/private radios, such as mobile radios and portable radios, which are configured to communicate directly with each other or through base station 108. System 100 also includes a network management component 110 which is configured to manage at least one TETRA network, for instance TETRA network 102. It should be appreciated by one skilled in the art that other components of TETRA networks 102-104 and system 100 are not shown in FIG. 1 for simplicity sake.

System 100 is referred to as an enhanced TETRA system in this document because it implements embodiments of enhanced TETRA protocols. In an embodiment, in system 100, four channels are interleaved into one carrier using Time Division Multiple Access (TDMA) protocol and a physical timeslot associated with each channel is divided into two sub-slots for processing two independent and simultaneous calls. Therefore, an embodiment of system 100 can support up to eight separate and simultaneous calls on each carrier. Although the discussion below is directed to dividing each timeslot into two sub-slots, other channel configurations are possible and are within the scope of this disclosure.

Figure 2:
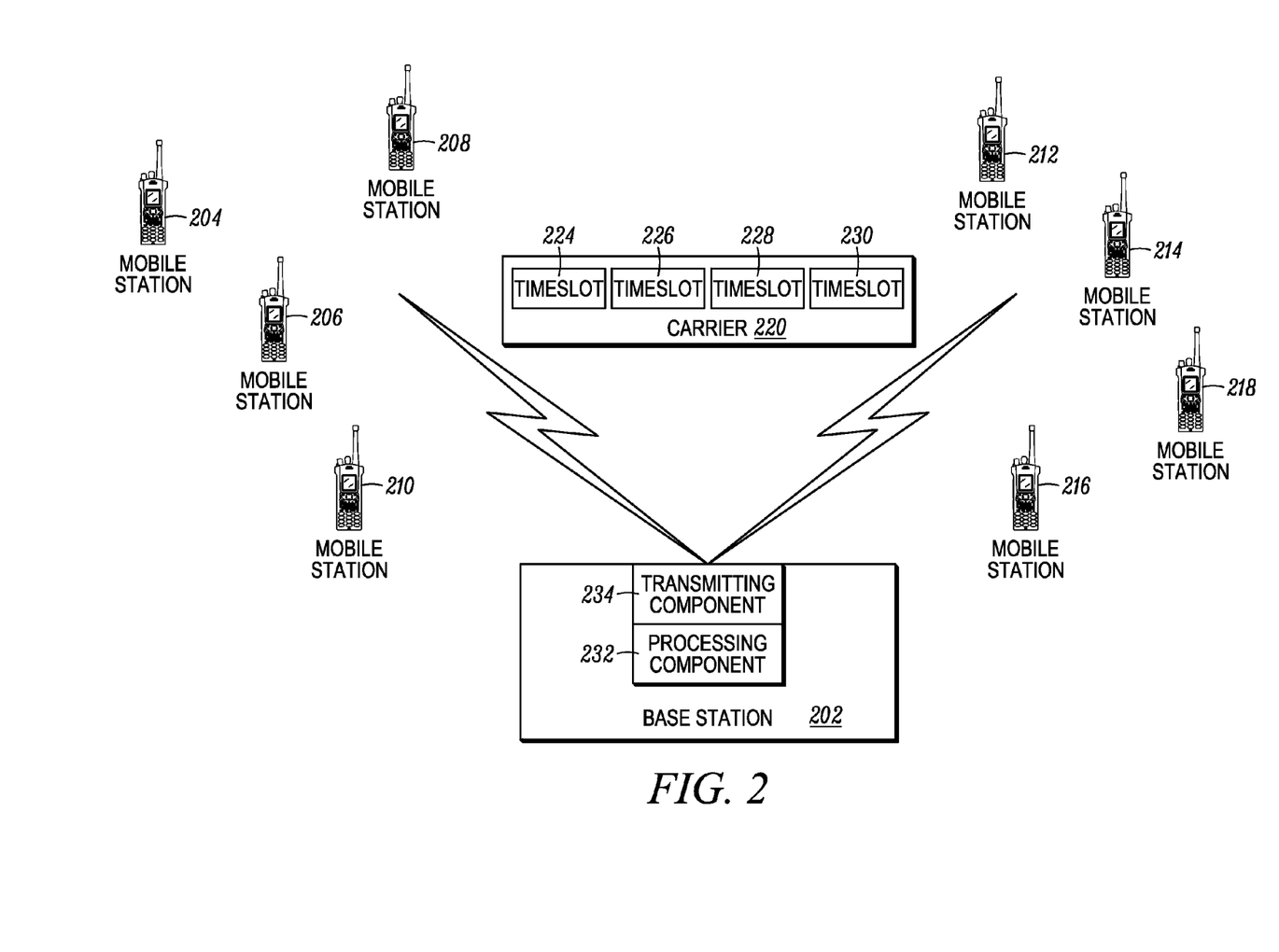
FIG. 2 is a block diagram of elements used in a TETRA system in accordance with some embodiments.

FIG. 2 is a block diagram of elements used in a TETRA system in accordance with some embodiments. Base station 202 includes a transmitting component 234 which is configured to transmit and receive information from mobile stations 204-210 and 212-218 through timeslots 224-230 in a carrier 220. Each timeslots 224-230 in carrier 220 is divided into two sub-slots; thus enabling carrier 220 to support up to eight independent and simultaneous calls. By dividing each timeslots 224-230 into two sub-slots, the TETRA frame structure has eight sub-slots per TDMA frame. This is further organized as eighteen TDMA frames per multiframe. Voice/data traffic from an eighteen frame multiframe length of time is compressed and conveyed within seventeen TDMA frames, thus allowing the eighteenth frame to be used for control signaling without interrupting the flow of data.

Base station 202 also includes a processing component 232 which is configured to generate or configure parameters related to enhanced TETRA protocols. Base station 202 transmits these parameters to mobile stations 204-210 and 212-218 when each mobile station 204-210 and 212-218 switches to an assigned channel on carrier 220. In order to permit a mobile station to use a specific sub-slot, base station 202 transmits a permission signal to mobile stations 204-210 and 212-218 in a logical Main Control Channel (MCCH). The MCCH is common to all mobile stations (subscribers) in a cell.

For a voice call, the main parameters for allocating an uplink transmission channel are a carrier frequency and a timeslot (one out of four) or a sub-slot (one out of two in a timeslot). Base station 202 sends initial channel allocation assignments on the MCCH by specifically addressing each assignment to related groups of mobile stations or to an individual mobile station. If, for example, base station 202 uses two different carrier frequencies, when it grants a transmit permission to one or more mobile stations, it directs the mobile station(s) to one of the two frequencies and a specific timeslot or sub-slot. For example, base station 202 may direct a mobile station to the second frequency and the second sub-slot in timeslot 228. Once the mobile station is allocated to a circuit (frequency and sub-slot), the allocation holds for subsequent downlink and uplink transmissions, such that any subsequent transmissions between base station 202 and the mobile station is conducted according to the allocated carrier frequency and sub-slot. As a result, both voice/data traffic and control/signaling streams are transmitted in the allocated channel.

In particular, signaling streams are transmitted in a logical Assigned Control Channel (ACCH) and voice/data traffic is transmitted in a logical Traffic Channel (TCH) on the allocated frequency and timeslot covering the particular sub-slot. Once the addressed mobile station(s) physically switches to the allocated channel, base station 202 communicates with the addressed mobile station only using the ACCH and TCH on the allocated channel. The ACCH and TCH share the same physical resources, which are different than the physical resources used for MCCH.

In some embodiments, the signaling on the MCCH is unchanged so that legacy TETRA units (based stations and/or mobile stations configured to operate on one of four timeslots in a carrier) can operate on an enhanced TETRA system, such as system 100. To indicate the difference between legacy and enhanced circuits in messages transmitted over the MCCH, the messages include an indication that a circuit is either an enhanced circuit, or a legacy circuit.

Base station 202 provides the indication of an enhanced circuit in usage markers which are typically associated with downlink and/or uplink channels engaged with circuit mode services. In general, the usage markers are used to prevent call interference (more than mobile stations sending voice traffic on the same timeslot at the same time) and for channel maintenance purposes. Base station 202 assigns a usage marker to each call before any traffic transmission takes place on an assigned channel. The assignment of the usage marker is conveyed in a Media Access Control (MAC)-RESOURCE packet data unit (PDU).

In some embodiments, on downlink slots, base station 202 sends an ACCESS-ASSIGN PDU which includes usage markers for each sub-slot on a channel. Base station 202 sends the ACCESS-ASSIGN PDU by using a logical Access Assignment Channel (AACH), which is mapped onto a broadcast block. The broadcast block is accessible to mobile stations on a timeslot. The information in the ACCESS-ASSIGN PDU enables base station 202 to control and regulate usage of the physical resources, such as channels, shared by multiple users. In some circumstances, the information in the ACCESS-ASSIGN PDU also gives mobile stations 204-210 and 212-218 tools to conduct, maintain and verify services, even in uncertain conditions. For example, in a fade, a listening mobile station may lose several frames. When the listening mobile station recovers from the fade, the mobile station may verify that the call is still on by looking at the usage marker in the AACH.

In general, the ACCESS-ASSIGN PDU typically conveys information about a downlink channel and also conveys information about access rights for a corresponding uplink sub-slot. For example, the ACCESS-ASSIGN PDU may include information about a downlink sub-slot by identifying the type of usage marker on the proper field of the ACCESS-ASSIGN PDU. For instance, when voice traffic is being transmitted on a downlink sub-slot, the ACCESS-ASSIGN PDU includes a unique identifier—a traffic usage marker identifier (UMt)—for indicting that the downlink sub-slot is being used for voice traffic. The traffic usage marker is a 6 bit Media Access Control (MAC) label that base station 202 assigns to a call when setting-up a circuit mode call. When a downlink sub-slot is not assigned to a specific call or is not used for signaling, the ACCESS-ASSIGN PDU includes an unallocated usage marker (UMx) for indicting that the downlink sub-slot is unused. When a downlink sub-slot is allocated for control information designated to a specific mobile station, the ACCESS-ASSIGN PDU includes an assigned control usage marker identifier (UMa) for indicting that the downlink sub-slot is used for transmitting control information directed to a specific mobile station.

The value of each usage marker in the ACCESS-ASSIGN PDU identifies the type of usage on each sub-slot. In some embodiments, the value of the unallocated usage marker identifier (UMx) in an ACCESS-ASSIGN PDU is set to "000000" to indicate that the associated downlink sub-slot is not assigned to a specific call and it is not used for signaling. The value of the assigned control usage marker identifier (UMa) in the ACCESS-ASSIGN PDU is set to "000001" to indicate that the associated downlink/uplink sub-slots are allocated for control information designated to a specific mobile station. The value of common control usage marker (UMc) in the ACCESS-ASSIGN PDU is set to "000010" to indicate that the associated downlink/uplink sub-slots are allocated for common control information for multiple parties. Other values may be assigned to the traffic usage marker identifier (UMt) to indicate that the associated downlink and uplink sub-slots are allocated for voice traffic.

To further control and regulate usage of physical resources shared by multiple mobile stations 204-210 and 212-218, base station 202 may broadcast access rights in the ACCESS-ASSIGN PDU. By broadcasting access rights, base station 202 minimizes the possibility of message collisions from different mobile stations and avoids protocol instability at the media access control level. Common or assigned access rights are relevant whenever different mobile stations attempt to use the same uplink physical resources, thereby resulting in collisions. Base station 202 may grant/reserve access rights for uplink sub-slots to a specific mobile station. Alternatively, base station 202 may grant access rights for uplink sub-slots to multiple mobile stations by enforcing a policy for random uplink access in order to reduce the probability of collision.

As previously noted, in circuit mode, voice/data traffic from an eighteen frame multiframe length of time is compressed and conveyed within seventeen TDMA frames, thus allowing the eighteenth frame to be used for control signaling without interrupting the flow of data. In order to minimize the bits used for the ACCESS-ASSIGN PDU in data packets in the seventeen TDMA frames, the ACCESS-ASSIGN PDU may be configured in different ways to convey information about a downlink channel and/or information about access rights for a corresponding uplink sub-slot.

Figure 3:
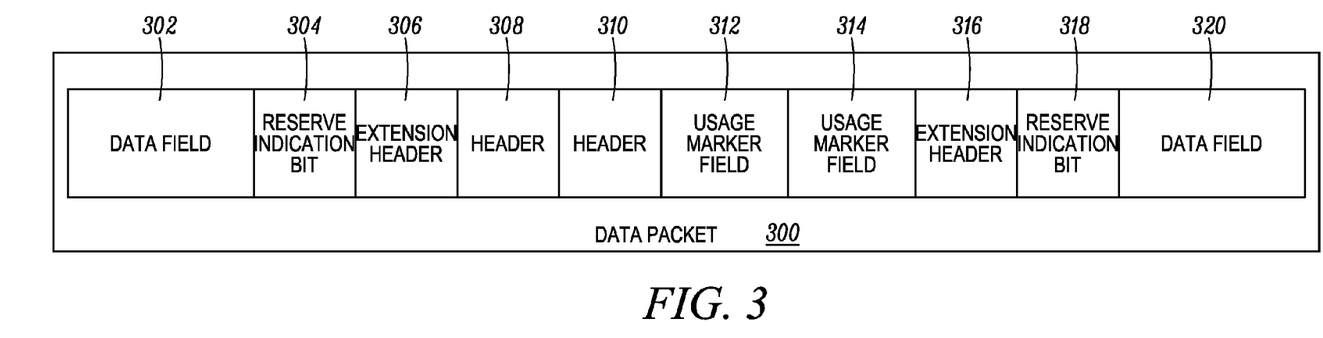
FIG. 3 is a block diagram of an embodiment of an ACCESS-ASSIGN PDU used in accordance with some embodiments.

FIG. 3 is a block diagram of an embodiment of an ACCESS-ASSIGN PDU used in accordance with some embodiments. ACCESS-ASSIGN PDU 300 includes data fields 302 and 320, each of which is allocated to a sub-slot of a timeslot and is used to transmit voice or signaling traffic. Each sub-slot in the timeslot is also allocated a respective reserved indication bit 304 or 318, a respective extension header field 306 or 316, a respective header field 308 or 310 and a respective usage marker field 312 or 314. The reserved indication bit 304 and 318 and extension header fields 306 and 316 are protected by a Forward Error Correcting Code. Other error protection schemes may also be used. Each of the fields in ACCESS-ASSIGN PDU 300 is placed in predefined positions which are associated with the corresponding sub-slot.

Header fields 308 and 310 and extension header fields 306 and 318 are placed in predefined positions in ACCESS-ASSIGN PDU 300 to correspond with the appropriate sub-slot. For example, header field 308 and extension header field 306 are placed in predefined positions of ACCESS-ASSIGN PDU 300 to correspond to the first sub-slot in the channel. Similarly, header field 310 and extension header field 316 are placed in predefined positions of ACCESS-ASSIGN PDU 300 to correspond to the second sub-slot in the channel. Extension header fields 306 and 316 are used with header fields 308 and 310 to interpret the information in usage marker fields 312 and 314. Accordingly, the value of the header field 308 or 310 and the extension header field 306 or 316 for each sub-slot indicates whether the uplink transmission on the sub-slot is allocated for voice traffic or signaling. For example, if the value of header field 308 or 310 is set to "1" and the value of the extension header field 306 or 316 is also set to "1", the associated usage marker for the sub-slot will be set to indicate that voice traffic is being transmitted on the uplink. If, for example, the value of header field 308 or 310 is set to "1", and the value of the extension header field 306 or 316 is set to "0", the associated usage marker for the sub-slot will be set to indicate that signaling information is being transmitted on the uplink. It should be apparent to one skilled in the art that other values may be used to indicate voice traffic or signaling. The values noted above only examples. On the downlink, the usage marker identifier for the sub-slots may be either a traffic usage marker identifier (UMt) or an assigned control usage marker identifier (UMa).

Reserved indication bits 304 and 318 are used to indicate that the respective sub-slot is reserved for a specific user or group of users for uplink transmissions. In an embodiment, in order to not expand the number of bits used by the ACCESS-ASSIGN PDU, the space for reserved indication bits 304 and 318 are taken from the data fields 302 and 320. Reserved indication bits 304 and 318 allow a base station to reserve a sub-slot for a mobile station for signaling. For example, while in signaling mode, a mobile station may send a U_PREPARE message to the base station in order to perform cell re-selection. A half rate random access capacity is inadequate to fulfill this request. The mobile station may therefore send a request to reserve an uplink sub-slot.

Although the ACCESS-ASSIGN PDU is traditionally used to convey information about the downlink slot in which it appears and also the access rights for the corresponding uplink slot, because only six information bits in ACCESS-ASSIGN PDU 300 are allocated for the usage marker/access rights value for each sub-slot, in some embodiments, ACCESS-ASSIGN PDU 300 do not include uplink access rights information (AF). A random access procedure is conducted autonomously by each mobile station, using a pre-defined random access protocol to control collision of messages from different mobile stations and to avoid protocol instability at the media access control level.

There are a few situations where both the usage marker and access rights are required at the same time and when only the usage marker or access right information does not convey complete information about the downlink channel and/or about access rights for a corresponding uplink sub-slot. In these situations, the uplink usage and the downlink usage are not the same. For example, the uplink may be assigned for voice communications while the downlink is used for transmitting control information directed to a specific mobile station or the uplink may be used for access right information while the downlink is used for voice communication. In some embodiments, the ACCESS-ASSIGN PDU is therefore configured to include either a usage marker or access right information.

Figure 4:
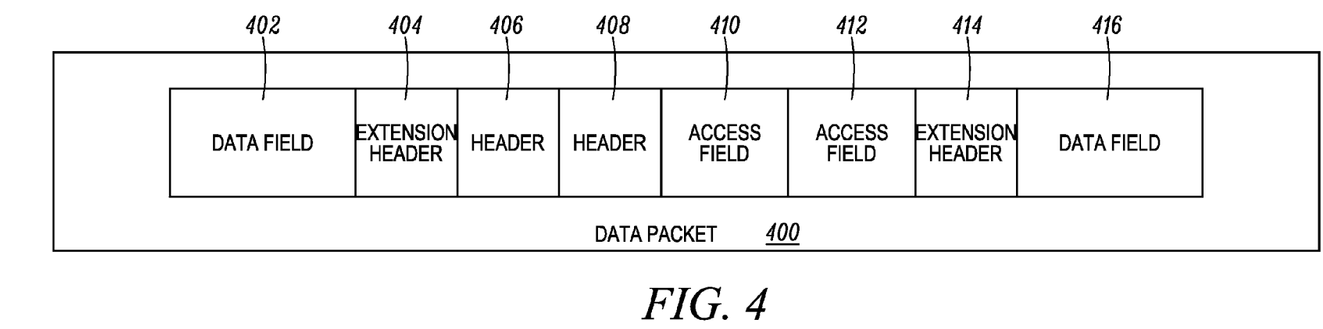
FIG. 4 is a block diagram of an embodiment of an ACCESS-ASSIGN PDU which includes access right information in accordance with some embodiments.

FIG. 4 is a block diagram of an embodiment of an ACCESS-ASSIGN PDU which includes access right information in accordance with some embodiments. ACCESS-ASSIGN PDU 400 includes data fields 402 and 416, extension header fields 404 and 414, header fields 406 and 408, and access fields 410 and 412, each of which is allocated to a sub-slot of a timeslot. ACCESS-ASSIGN PDU 400 is mainly designed for uplink access rights, therefore access rights information is sent instead of usage marker. Each of the fields in ACCESS-ASSIGN PDU 400 is placed in predefined positions which are associated with the corresponding sub-slot.

Accordingly, in one embodiment, when a sub-slot is used for voice traffic on the uplink, the respective header field 406 or 408 and the associated extension header field 404 or 414 will include a value, for example "11", which denotes that the uplink is being used for voice traffic. The access field 410 or 412 will include an access rights value that denotes that the uplink is reserved for a calling mobile station. On the other hand, when the sub-slot is engaged in signaling on the uplink, the respective header field 406 or 408 and the associated extension header field 404 or 414 will include a value, for example "10", which denotes that the uplink is engaged in signaling. The access field 410 or 412 will include an access rights value that denotes that the uplink is usable by all mobile stations for random access requests.

Because ACCESS-ASSIGN PDU 400 is designed to primarily manage uplink access rights, the access rights information is given priority over the usage marker when the uplink is usable by all mobile stations for random access requests. Accordingly, in another embodiments, when the sub-slot is used for voice traffic on the uplink, the respective header field 406 or 408 and the associated extension header field 404 or 414 will include a value, for example "11", which denotes that the uplink is being used for voice traffic. The access field 410 or 412 will include usage marker value that denotes that the downlink is engaged with either traffic (UMt), signaling (UMa) or not allocated at all (UMx). On the other hand, when the sub-slot is engaged in signaling on the uplink, the respective header field 406 or 408 and the associated extension header field 404 or 414 will include a value, for example "10", which denotes that the uplink is engaged in signaling. The access field 410 or 412 will include an access right value that denotes that the uplink is usable by all mobile stations for random access requests. Other alternatives may be use for specifying downlink usage.

Figure 5:
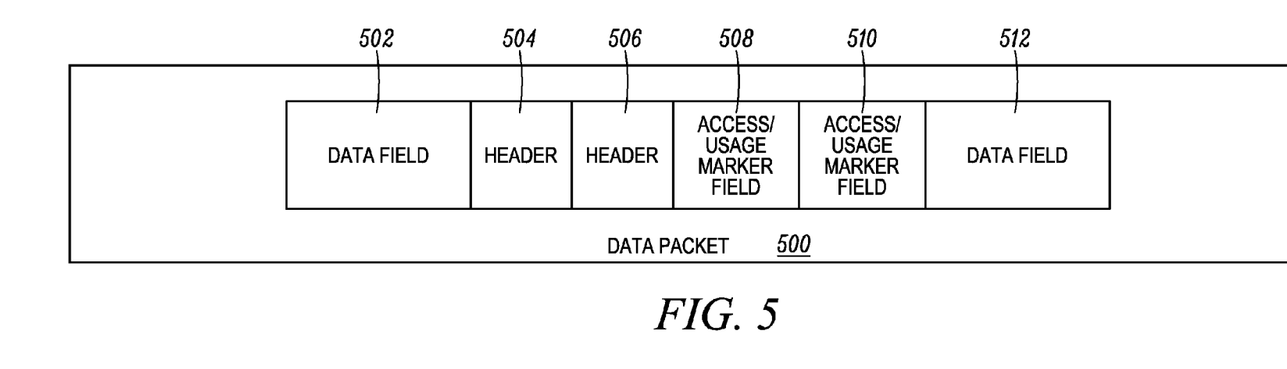
FIG. 5 is a block diagram of another embodiment of an ACCESS-ASSIGN PDU for transmitting either usage marker information or access rights information in accordance with some embodiments.

When in service, a channel is already assigned to a specific party and the control messages for engaging the uplink ongoing channel in voice traffic or control signaling are available without using the ACCESS-ASSIGN PDU. Thus, the ACCESS-ASSIGN PDU may be configured to carry either usage markers or access rights information, as needed. FIG. 5 is a block diagram of another embodiment of an ACCESS-ASSIGN PDU for transmitting either usage marker information or access rights information in accordance with some embodiments. ACCESS-ASSIGN PDU 500 includes data fields 502 and 512, header fields 504 and 506, and access/usage marker fields 508 and 510, each of which is allocated to a sub-slot of a timeslot. The value of the header field 504 or 506 indicates activity on the associated sub-slot. For example, when the value in header field 504 is "1", this denotes that the ongoing uplink channel is engaged in a circuit mode service, assigned for a specific party. A unique service identifier (UMt) or other control messages (UMa or UMx) is usually expected in access/usage marker field 508 for the first sub-slot. The same usage marker will indicate usage on both the uplink and downlink. The downlink ongoing channel can be engaged in a circuit mode service or assigned control messages which are assigned for the specific party.

When in service and the value in header field 504 is "0", this denotes that the ongoing uplink channel may be used for uplink signalization purpose, for example random access requests. The access rights information is usually expected in access/usage marker field 508. The downlink ongoing channel can be engaged in a circuit mode service or assigned control messages which are assigned for the specific party.

When the value in header field 504 denotes that the ongoing uplink channel may be used for uplink signalization, because the uplink channel is available to all listeners, it is essential to settle the access rights during the downlink even though the downlink slots carry service items, for example speech items. The access rights information, while the uplink is assigned for control, will be available in each sub-slot in all frames excluding predefined frames, for example frames six and twelve. In these pre-defined frames, the start of a new access frame will not be allowed.

While in service and when the downlink ongoing channel is engaged in voice traffic, for control and service validation purposes, on the predefined frames access/usage marker field 508 or 510 may include a service identifier (UMt) or any other usage markers (UMa or UMx). With this information each service in each sub-slot can follow and detect the validity of the ongoing data by decoding the unique service identifier (UMt). The same allocated usage marker will serve both, uplink and downlink for sub-slot information usage. The uplink access rights default value, in the predefined frames, will be interpreted as valid random access opportunity by implicitly denoting an "ongoing frame". The validity of the current channel assignment can be detected in a pre-defined frame sequence, respective to the predefined frames. The frequency of the assigned channel validity check is decreased.

While in service and when the downlink ongoing channel is engaged in voice traffic, if access/usage marker field 508 or 510 included an assigned control usage marker (UMa), resources assigned for speech are taken for signaling. An identifier may be used to indicate the "resource stealing". In this case, whether the uplink ongoing channel is engaged in voice traffic or control signaling, the downlink control messages will be denoted in access/usage marker field 508 or 510 as an assigned control usage marker.

Figure 6:
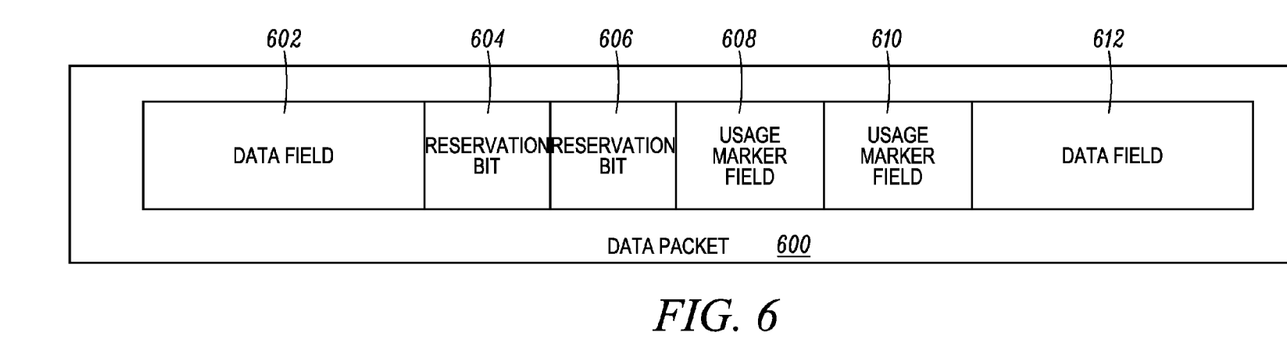
FIG. 6 is a block diagram of another embodiment of an ACCESS-ASSIGN PDU wherein reservation bits are used to reserve a sub-slot in accordance with some embodiments.

FIG. 6 is a block diagram of another embodiment of an ACCESS-ASSIGN PDU wherein reservation bits are used to reserve a sub-slot in accordance with some embodiments. ACCESS-ASSIGN PDU 600 includes data fields 602 and 612, reservation fields 604 and 606, and usage marker fields 608 and 610, each of which is allocated to a sub-slot of a timeslot. Reservation fields 604 and 606 for each sub-slot will allow the base station to reserve a suitable sub-slot for a mobile station, for which reserved access rights have been granted for signaling or traffic. While the uplink is engaged in traffic, reservation fields 604 and 606 will be set to, for example "1", to indicate that the uplink channel is reserved to a calling mobile station. While the uplink is engaged in signaling, if the mobile stations sends a U_PREPARE message in order to perform cell re-selection, fragments are sent in a reserved uplink sub-slot and reservation fields 604 and 606 will be set to, for example "1". In all other cases where a random access procedure is allowed, reservation fields 604 and 606 will be set to, for example "0".

When the uplink is assigned for voice traffic, usage marker fields 608 and 610 may include a service identifier (UMt) or any other control messages (UMa or UMx) for each sub-slot. In both downlink cases (voice traffic or control signaling), access rights are irrelevant because the transmission is reserved only for a calling mobile station and this information is explicitly conveyed in the respective reservation fields 604 and 606.

When the uplink is assigned for signaling, ACCESS-ASSIGN PDU 600 will no longer contain uplink access right information. A random access procedure will be conducted autonomously by each mobile, using a predefined random access protocol. This mechanism is used to control collision of messages from different mobile stations and to avoid protocol instability at the media access control level.

Figure 7:
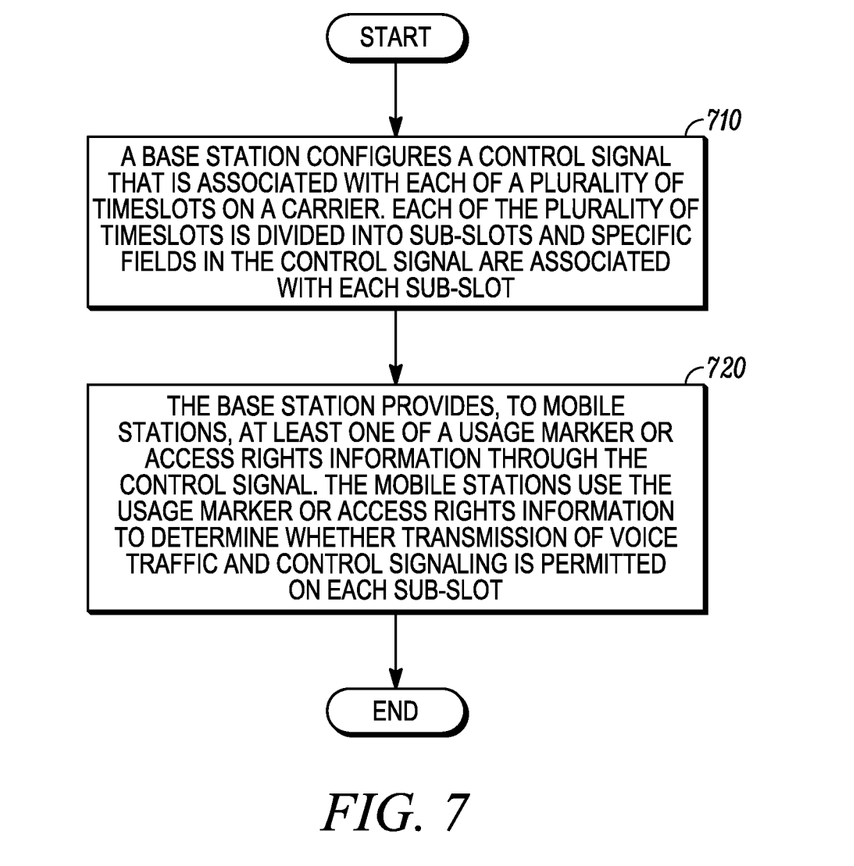
FIG. 7 is a flowchart of a method for conveying usage and access rights information for each sub-slot.

FIG. 7 is a flowchart of a method for conveying usage and access rights information for each sub-slot. In 710, a base station configures a control signal that is associated with each of a plurality of timeslots on a carrier. Each of the plurality of timeslots is divided into sub-slots and specific fields in the control signal are associated with each sub-slot. In 720, the base station provides, to mobile stations, at least one of a usage marker or access rights information through the control signal. The mobile stations use the usage marker or access rights information to determine whether transmission of voice traffic and control signaling is permitted on each sub-slot.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for increasing calling capacity in a carrier, the method comprising:
   configuring, by the base station, a control signal that is associated with each of a plurality of timeslots on the carrier, wherein each of the plurality of timeslots is divided into sub-slots and specific fields in the control signal are associated with each one of the sub-slots; and
   providing, by the base station to mobile stations, at least one of a usage marker or access rights information through the control signal for each sub-slot and placed in predefined positions of the control signal allocated to a specific one of the sub-slots, wherein the mobile stations use the usage marker or access rights information to determine whether transmission of voice traffic and control signaling is permitted on the specific one of the sub-slots.

2. The method of claim 1, wherein the providing further comprises providing, through the control signal, a reservation bit, an extension header, a header, the usage marker and a data field for each one of the sub-slots.

3. The method of claim 2, further comprising the base station using the reservation bit to indicate that a specific one of the sub-slots is reserved for a specific user or group of users for uplink transmissions.

4. The method of claim 2, wherein the providing further comprises placing the extension header and the header in predefined positions of the control signal, wherein the predefined positions are allocated to a specific one of the sub-slots.

5. The method of claim 4, further comprising placing predefined values in the extension header and the header to allow the usage marker to be interpreted and to identify whether transmission of voice traffic and control signaling is permitted on the specific one of the sub-slots.

6. The method of claim 1, wherein the providing further comprises providing, through the control signal, an extension header, a header, the access rights information, and a data field for each one of the sub-slots.

7. The method of claim 6, wherein when a particular sub-slot is used for voice traffic on the uplink, the control signal includes an access rights value which denotes that the uplink is reserved and when the particular sub-slot is used for signaling on the uplink, the control signal includes an access rights value which denotes that the uplink is usable by all mobile stations for random access requests.

8. The method of claim 6, wherein when a particular sub-slot is used for voice traffic on the uplink, the control signal includes the usage marker value which denotes that the downlink is engaged in either traffic, signaling, or is not allocated and when the particular sub-slot is used for signaling on the uplink, the control signal includes an access rights value which denotes that the uplink is usable by all mobile stations for random access requests.

9. The method of claim 1, wherein the providing further comprises providing, through the control signal, a header, the usage marker or access rights information, and a data field for each one of the sub-slots.

10. The method of claim 9, wherein a value of the header indicates activity on the specific one of the sub-slots and indicates whether the usage marker or access rights information is included in the control signal.

11. The method of claim 10, wherein when the header indicates that the uplink on the specific one of the sub-slots is to be used for random access requests, the access rights information is provided during the downlink.

12. The method of claim 11, wherein the access rights information is available in all frames, excluding predefined frames.

13. The method of claim 12, wherein on the predefined frames, when the downlink is engaged in voice traffic, the control signal includes a usage marker for voice traffic or a usage marker assigning control to a specific party.

14. The method of claim 13, wherein the usage marker indicates assigned control to a specific party, resources assigned for speech are taken for signaling.

15. The method of claim 1, wherein the providing further comprises providing, through the control signal, a reservation bit, the usage marker, and a data field for each one of the sub-slots.

16. The method of claim 15, wherein the reservation bit is used to reserve the specific one of the sub-slots for a specific party.

17. The method of claim 15, wherein reservation bit is used to indicate that mobile stations may perform a random access procedure on the specific one of the sub-slots when the uplink is assigned for signaling.

18. A base station, comprising:
a processing component for configuring a control signal that is associated with each of a plurality of timeslots on a carrier, wherein each of the plurality of timeslots is divided into sub-slots and specific fields in the control signal are associated with each one of the sub-slots; and
a transmitting component configured to transmit, to mobile stations, at least one of a usage marker or access rights information through the control signal for each sub-slot and placed in predefined positions of the control signal allocated to a specific one of the sub-slots,
wherein the usage marker or access rights information indicates whether transmission of voice traffic and control signaling is permitted on the specific one of the sub-slots.

19. The base station of claim 18, wherein the transmitting component is further configured to transmit, through the control signal, a reservation bit, an extension header, a header, the usage marker and a data field for each one of the sub-slots, the reservation bit indicating that a specific one of the sub-slots is reserved for a specific user or group of users for uplink transmissions.

20. The base station of claim 18, wherein the transmitting component is further configured to transmit, through the control signal, a reservation bit, an extension header, a header, the usage marker and a data field for each one of the sub-slots, placing the extension header and the header in predefined positions of the control signal, wherein the predefined positions are allocated to a specific one of the sub-slots.

* * * * *